United States Patent
Moffatt et al.

(10) Patent No.: US 9,536,281 B2
(45) Date of Patent: Jan. 3, 2017

(54) IMAGE SCALING FOR IMAGES INCLUDING LOW RESOLUTION TEXT

(71) Applicant: INTERNATIONAL BUSINESS MACHINES CORPORATION, Armonk, NY (US)

(72) Inventors: Edwin P. J. Moffatt, Southampton (GB); Luke P. Staddon, Basingstoke (GB)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 14/255,466

(22) Filed: Apr. 17, 2014

(65) Prior Publication Data

US 2014/0347399 A1 Nov. 27, 2014

(30) Foreign Application Priority Data

May 24, 2013 (GB) .................................. 1309352.1

(51) Int. Cl.
*G06T 3/40* (2006.01)

(52) U.S. Cl.
CPC .................................. *G06T 3/4007* (2013.01)

(58) Field of Classification Search
None
See application file for complete search history.

(56) References Cited

U.S. PATENT DOCUMENTS

| | | | |
|---|---|---|---|
| 7,272,258 B2* | 9/2007 | Berkner | G06T 11/60 382/298 |
| 8,280,193 B2 | 10/2012 | Weiss et al. | |
| 8,503,782 B2* | 8/2013 | Vincent | G06K 9/3258 382/190 |
| 9,002,111 B2* | 4/2015 | Bodin | G06T 3/40 382/298 |
| 2003/0095135 A1* | 5/2003 | Kaasila | G06F 3/0481 345/613 |
| 2004/0056899 A1* | 3/2004 | Sinclair, II | G06T 3/40 715/800 |
| 2005/0226538 A1* | 10/2005 | Di Federico | G06T 3/4007 345/660 |

(Continued)

FOREIGN PATENT DOCUMENTS

WO 2008003095 A2 1/2008
WO 2011112522 A2 9/2011

OTHER PUBLICATIONS

Wooldridge et al., "Teach Yourself Visually Adobe Photoshop CS6", Visual, Jun. 13, 2012.*

(Continued)

*Primary Examiner* — Chante Harrison
(74) *Attorney, Agent, or Firm* — Law Office of Jim Boice

(57) ABSTRACT

A method and system are provided for image scaling including low resolution text areas. The method may include: determining one or more areas of text in an image to be scaled; scaling the one or more areas of text using two or more scaling algorithms to a required resolution to acquire two or more scaled versions of the text area; selecting the clearest text in a text area from two or more scaled versions of the text area; scaling the overall image to the required resolution; and merging the scaled overall image with the selected scaled version of each text area.

17 Claims, 6 Drawing Sheets

(56) References Cited

U.S. PATENT DOCUMENTS

| | | | |
|---|---|---|---|
| 2009/0041352 A1* | 2/2009 | Okamoto | G06T 11/60 |
| | | | 382/176 |
| 2010/0208996 A1 | 8/2010 | Noonan et al. | |
| 2012/0110438 A1* | 5/2012 | Peraza | G06F 17/214 |
| | | | 345/660 |
| 2012/0281139 A1* | 11/2012 | Zhang | G06T 3/40 |
| | | | 348/468 |
| 2013/0039570 A1 | 2/2013 | Vincent et al. | |
| 2013/0272613 A1* | 10/2013 | Bodin | G06T 3/40 |
| | | | 382/182 |

OTHER PUBLICATIONS

Kwon, et al., "Analysis and Design for Text Readability Increase in Quad-Structure RGBW Color EPD", 2012 IEEE International Symposium on Circuits and Systems (ISCAS), May 20-23, 2012, pp. 1724-1727.

Basu, Prabahan, "A New Technique for the Restoration of Low Resolution Text Images", 2007 IEEE International Conference on Systems, Man and Cybernetics, Oct. 7-10, 2007, pp. 3990-3995.

* cited by examiner

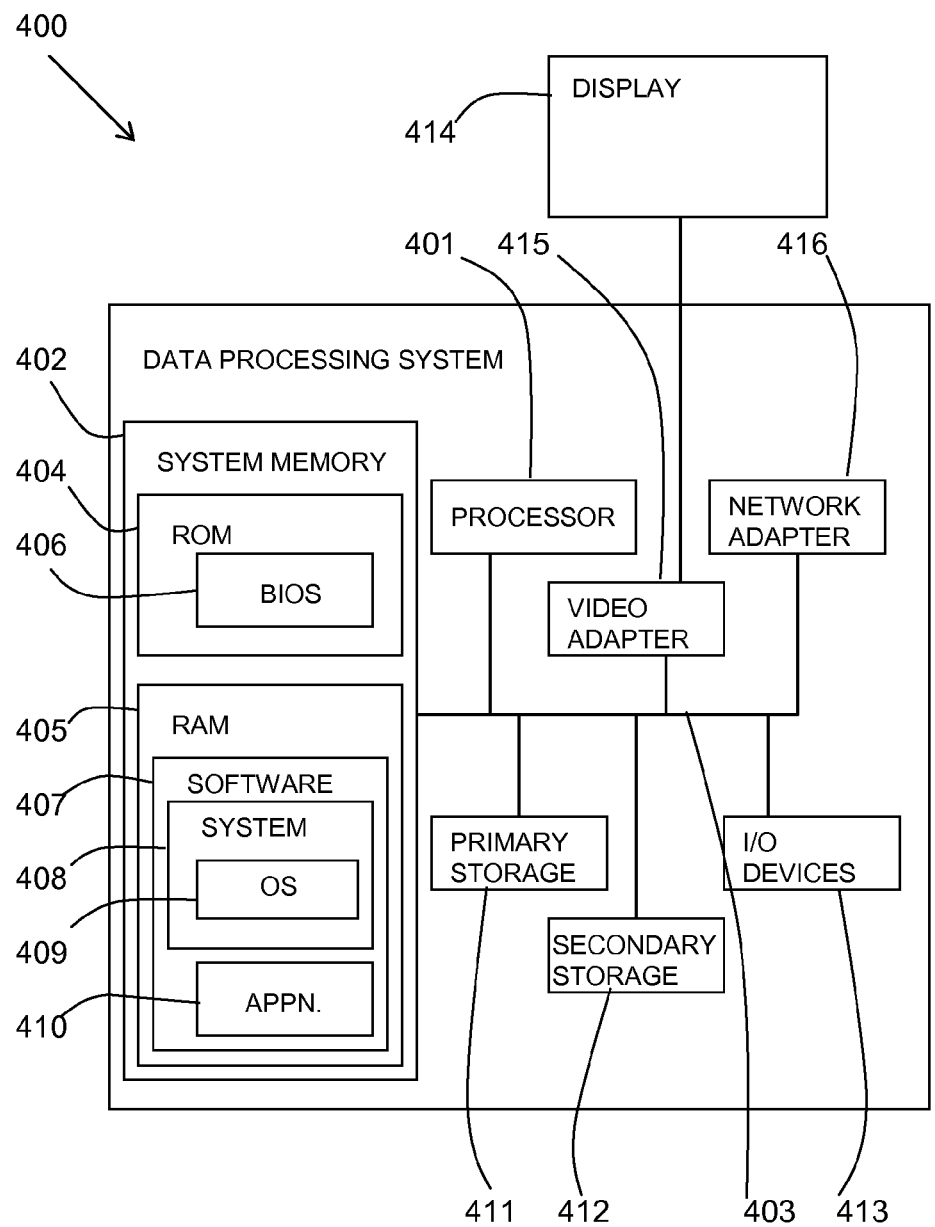

IMAGE SCALING FOR IMAGES INCLUDING LOW RESOLUTION TEXT

BACKGROUND

This invention relates to the field of image scaling. In particular, the invention relates to image scaling for images including low resolution text.

There are multiple situations in which modern day applications attempt to increase the resolution of older applications in order to allow them to run effectively on newer monitors. One such example would a video game emulator. The scaling process used to increase the resolution of images works well for most cases. However, when it comes to scaling low resolution text, the most effective algorithms for dealing with images often leave the text unreadable.

To exacerbate further, current emulators only offer the ability to apply pixel scaling to all of the screen or nothing at all. The same is true of all real-time post-processing algorithms for image re-sampling.

Some algorithms which produce readable text do exist, but such algorithms are very computationally expensive and cannot be performed in real time.

The reason that text does become blurry when scaled up, is that good quality image scaling relies on creating blending (akin to anti-aliasing methods) of the new pixels that are added between existing pixels. When this is applied to low resolution text, the resulting characters become blurry and unreadable.

In a standard pixel scaling algorithm, the newly formed pixels' color values are pulled towards those of their neighbors. It is clear that applying this algorithm multiple times to a very simple image that requires hard edges, such as a letter, could cause that image to distort and become unrecognizable.

SUMMARY

A method and system are provided for image scaling including low resolution text areas. The method may include: determining one or more areas of text in an image to be scaled; scaling the one or more areas of text using two or more scaling algorithms to a required resolution to acquire two or more scaled versions of the text area; selecting the clearest text in a text area from two or more scaled versions of the text area; scaling the overall image to the required resolution; and merging the scaled overall image with the selected scaled version of each text area.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which:

FIG. 4 is a block diagram of an embodiment of a computer system in which the present invention may be implemented.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and a system are provided for improving the readability of the text in a low resolution image, once the image has been scaled up.

Figure 1:
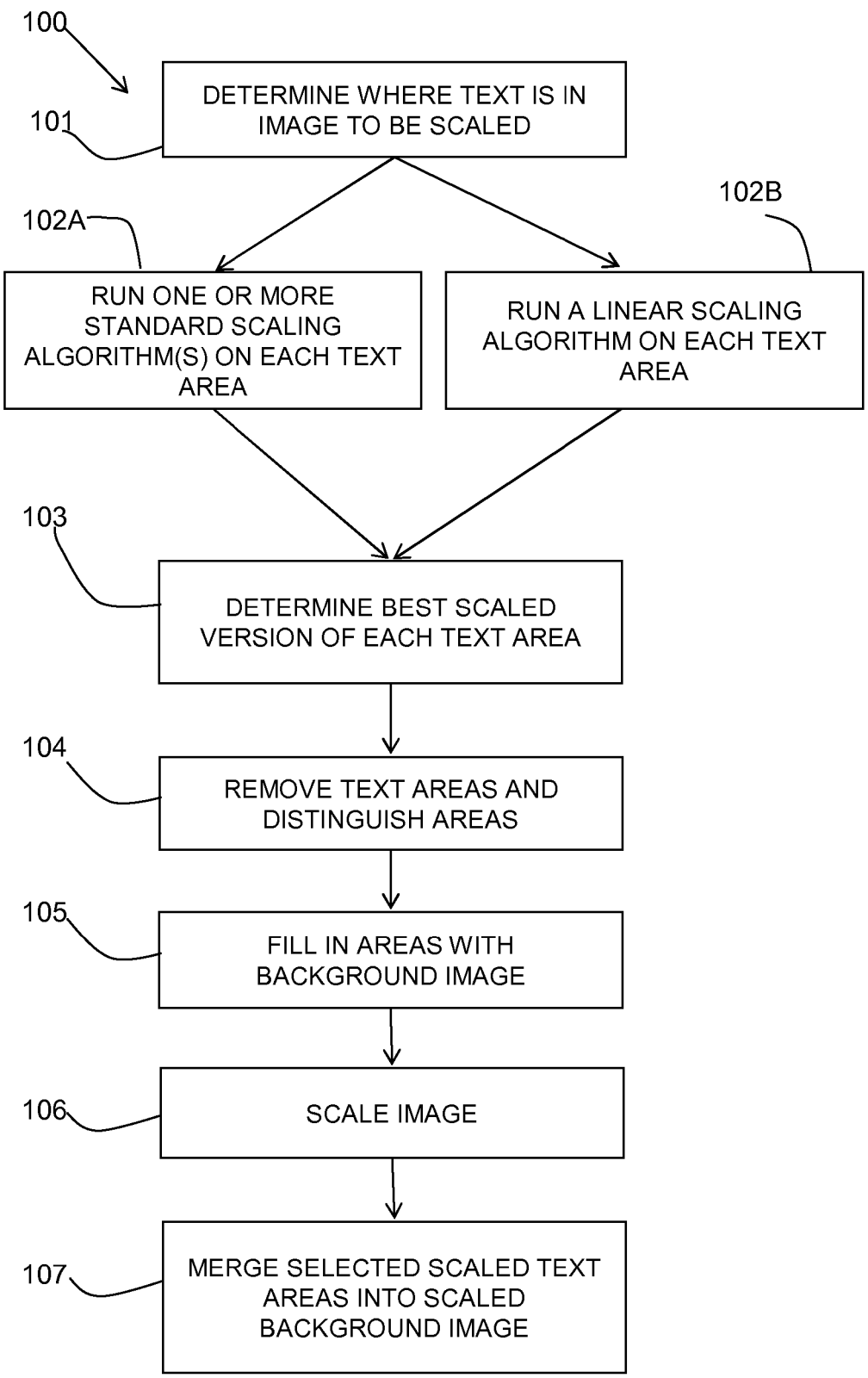
FIG. 1 is a flow diagram of an example embodiment of a method in accordance with the present invention.

Referring to FIG. 1, a flow diagram 100 shows an embodiment of the described method. An image is received for scaling, for example, this may be a screen displayed image. It is determined 101 where there are areas of text in the image.

In order to perform this step, a standard piece of text-recognition software may be used to identify the position of each area of text. For example, this may be an individual letter, numeral or symbol, or a group of such figures. Once this has been obtained, a bounding box may be drawn around the text, thereby allowing the program to determine which portions of the image should be left un-scaled.

In some applications, the algorithm may be further optimized by providing very specific rules. For example, if up-scaling a game in which text boxes always appear in a certain part of the screen, only that part may be checked. Furthermore, if the text areas always have a particular color background, the color value of a certain pixel or group of pixels matching that value may be searched, and then it may be assumed that text is present.

One or more standard scaling algorithms may be run 102A on each area of text. The one or more scaling algorithms 102A may use different techniques to clarify text during the scaling operation. For example, such techniques may include nearest-neighbor interpolation, bilinear interpolation, hqx, supersampling, and vectorization.

There are a large variety of image scaling algorithms available. The choice of algorithm may depend on multiple factors, such as the processing power of the hardware, the starting image resolution and the resulting image resolution. On good quality hardware, it may be possible to run multiple algorithms concurrently, thereby allowing the best result from the selection of images produced.

A linear scaling algorithm may also be run 102B on each area of text. The linear scaling algorithm may be referred to as a "null" algorithm with no manipulation of the text. Such a linear scaling algorithm may not anti-aliasing. For example, in a linear scaling algorithm to double the dimensions of something in which there is a single white pixel, the single white pixel is replaced by a square block of 4 white pixels.

In an alternative embodiment, the one or more scaling algorithms may be compared to the original text in order to determine which is the clearest. If the original text is determined to be the clearest it may then be scaled using a linear scaling algorithm. This method may not be suitable for some applications, and so it could be a configurable option whether to consider "use original text" a valid decision or not.

It may then be determined 103 using text-recognition which of the scaled versions of each text area is the most readable. If more than one scaling algorithm is used in step 102A, then multiple scaled text areas may be compared.

Once there are two or more images of a text area, they may be run through a piece of text-recognition software to obtain a metric for how "recognizable" each text area is. The image with the best metric may then be selected. This process may be performed for each identified section of text.

It should be noted that the optimal image scaling algorithm for a text area that may be selected via this method may well be different from the scaling algorithm that is being applied to the main, background or overall image (the "non-text" parts), and indeed other distinct text areas.

If a scaled version of a text area is more readable 103, then it is selected for that text area. This is useful for highly decorative, large text, etc. An example of this may be a company name in a logo.

Where any original versions of the text occur in the image, there may be gaps between it and the background. In one embodiment, in order to fill gaps in the text in, a text area may be removed 104 entirely from the overall or background image and where the text had previously existed, the background may be filled with a color that is easily distinguished from that of the background, such as zero alpha or full white.

Once the areas which previously contained text have been identified, they can be filled 105 by looking at the surrounding background color and filling across it. It should be noted that this step may be performed on the pre-scaled overall or background image, as it will contain significantly less pixels, thereby making processing time far quicker. One such algorithm that could be used is the "intelligent fill" from Photoshop CS6 (Photoshop is a trade mark of Adobe Systems Incorporated).

A cruder but quicker method is to look at the edge pixels of a given character and use the existing pixels of the background image that neighbor it to determine its value. This is easily performed by averaging the neighboring values. The algorithm would then work around the character in a spiralling motion until the entire space was filled. The fill this provides is not as accurate as the "intelligent fill". However, in the majority of cases, this will not be a problem. This is because most backgrounds on low resolution programs are single colors. If they are not, it is likely that the area that was filled by the character in the background image will still be covered by it in the scaled up version.

A standard scaling algorithm may be performed 106 on the main image. Finally, the scaled text images and the main image may be merged 107 into one. The offsets of the text images relative to the main image may have been preserved from the point at which they were originally identified.

This step may be performed by simply replacing pixels in the main image with any non-alpha pixels in the text images. This description assumes that the "text image" is a single image which features alpha in areas where text was not selected, and then image data in the boxes that were drawn around areas where text was detected. Essentially, the text may put this on top of the scaled image, which results in the main image showing through in the areas where no text was detected, and the text being drawn over the top of whatever was in the main image in the areas where text was detected.

In an alternative embodiment to steps 104 and 105, the text areas may not be removed from the background image, but instead scaled up within the background image and the individually scaled text areas may be merged 107 with the background image by overwriting the previous text areas.

The intention of this method is that different areas of the screen may have different scaling algorithms applied.

In one embodiment, there may be an additional step prior to the merging 107 of the scaled text areas into the scaled background image of applying shaders to the background image. Shaders are a technique used within games emulators to improve the graphics; however, they do not handle text very well. An emulator may allow a user to configure a method of upscaling and then also optionally plug in a shader on top of that.

In the described method, as the text areas of the image or screen have been separated out to be drawn over the top of the image in the merging step to produce a combined output, if the emulator is applying both upscaling and subsequently a shader, then the merging step may take place after both the upscale and the shader have been applied to the image.

One example outcome of the described method may be to select and apply a vectorizing or hqx scaling algorithm to the identified text areas, whilst upscaling the image and applying shaders. The described method enables sections of the screen that contain text to avoid having shaders applied.

Referring to FIGS. 2A to 2D, schematic diagrams show the described processing of an image to be scaled containing areas of text.

Figure 2A:
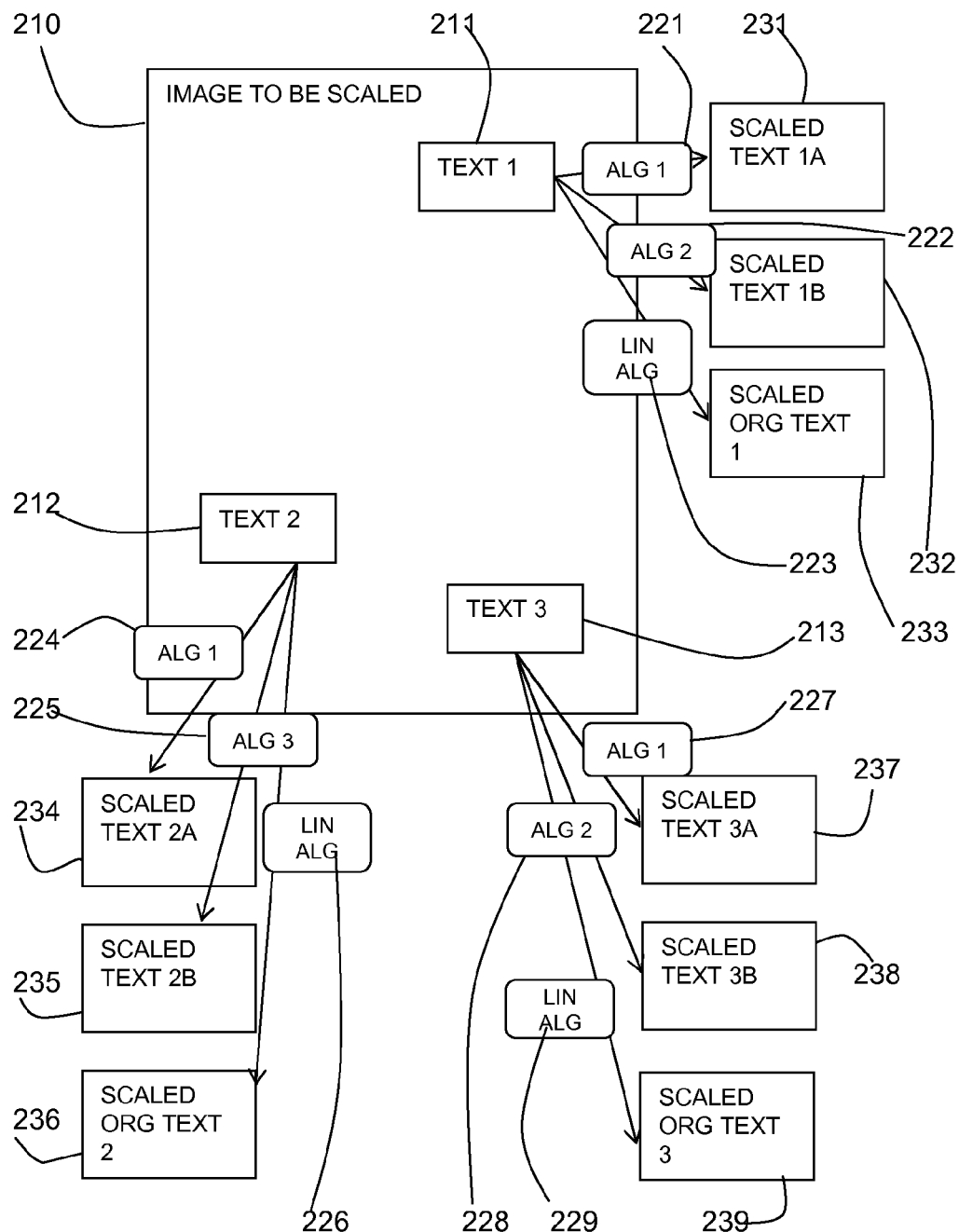
FIGS. 2A to 2D are schematic diagrams showing the processing of an image in accordance with the present invention.

FIG. 2A shows an image 210 to be scaled which may have one or more text areas 211, 212, 213 shown in the figures as "text 1" 211, "text 2" 212, and "text 3" 213. The text areas 211, 212, 213 may be identified by text-recognition software.

Each text area 211, 212, 213 may be processed by applying one or more scaling algorithms.

In the case of the first text area "text 1" 211, a first scaling algorithm "alg 1" 221 may be applied to result in "scaled text 1A" 231 and a second scaling algorithm "alg 2" 222 may be applied to result in "scaled text 1B" 232. A linear-scaling algorithm "lin alg" 223 may be applied to result in a linear-scaled version of the original text "scaled original text 1" 233. These scaled versions of the text area may be evaluated by text-recognition software to determine how recognizable the text is.

An equivalent process may be carried out for the second and third text areas. Different scaling algorithms may be used for different text areas.

In the case of the second text area "text 2" 212, the first scaling algorithm "alg 1" 224 may be applied to result in "scaled text 2A" 234 and a third scaling algorithm "alg 3" 225 may be applied to result in "scaled text 2B" 235. A linear-scaling algorithm "lin alg" 226 may be applied to result in a linear-scaled version of the original text "scaled original text 2" 236. These scaled versions of the text area may be evaluated by text-recognition software to determine how recognizable the text is.

In the case of the third text area "text 3" 213, the first scaling algorithm "alg 1" 227 may be applied to result in "scaled text 3A" 237 and the second scaling algorithm "alg 2" 228 may be applied to result in "scaled text 3B" 238. A linear-scaling algorithm "lin alg" 229 may be applied to result in a linear-scaled version of the original text "scaled original text 3" 239. These scaled versions of the text area may be evaluated by text-recognition software to determine how recognizable the text is.

Figure 2B:
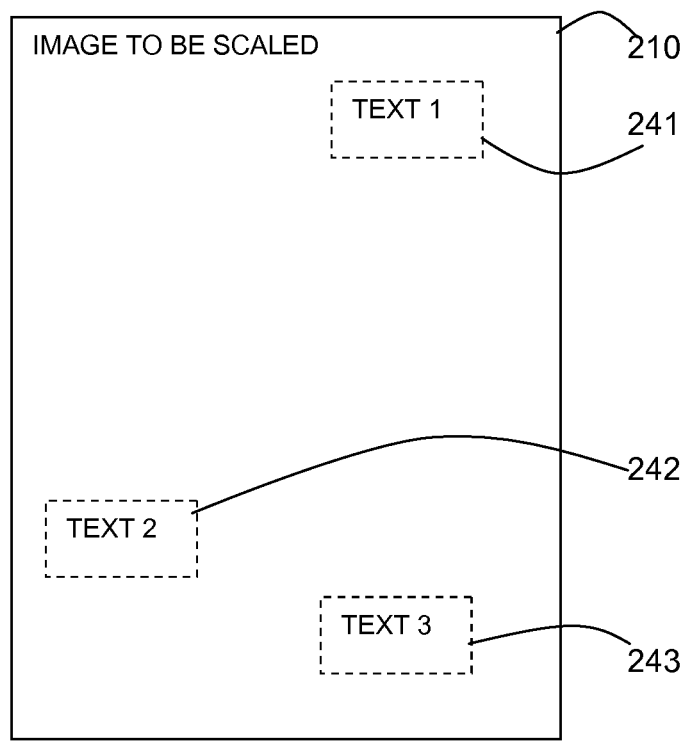
Figure 2C:
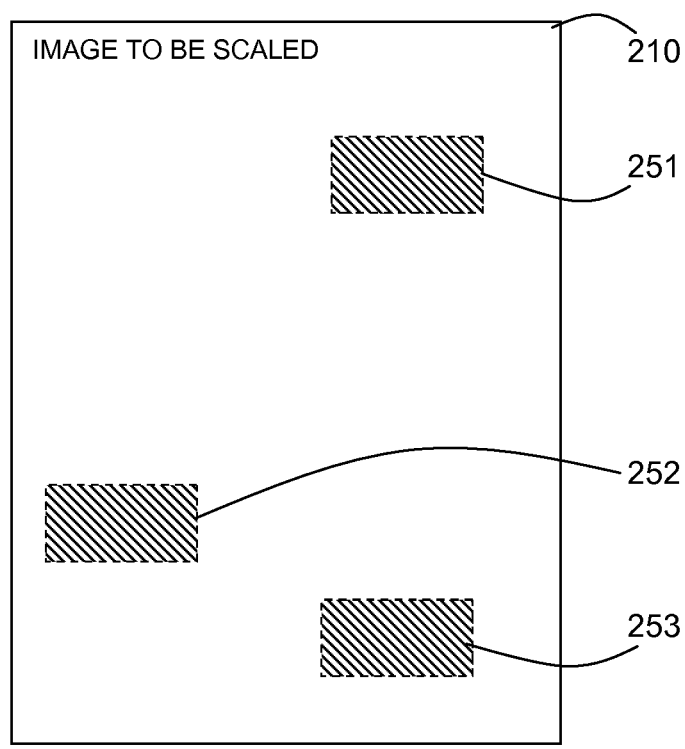

Referring to FIGS. 2B and 2C, the text areas 211, 212, 213 may be removed from the image to be scaled 210 leaving areas 241, 242, 243. The offsets of the removed areas in the image 201 may be recorded. The areas 241, 242, 243 may be filled 251, 252, 253 with the background color of the image to be scaled 210.

Figure 2D:
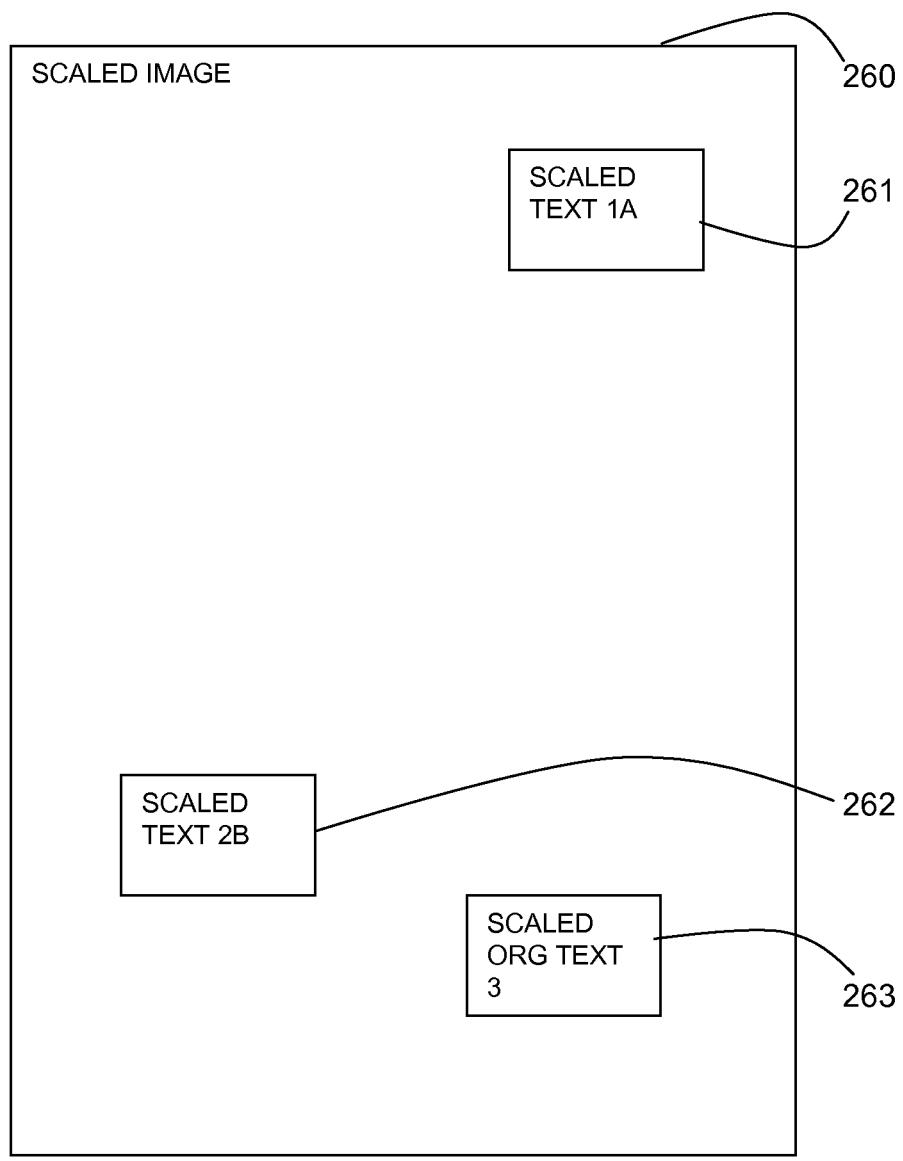

Referring to FIG. 2D, the image to be scaled 210 is scaled using a suitable scaling algorithm for the content of the image to result in a scaled image 260. Optionally, shaders may be applied to the scaled image 260.

The selected scaled text areas 251, 252, 253 may be merged at the correct offsets into the scaled image 260. For example, the "scaled text 1A" 231 from FIG. 2A may have been selected for the first scaled text area 261; the "scaled text 2B" 235 may have been selected for the second scaled text area 262; and the "scaled original text 3" 239 may have been selected for the third scaled text area 263.

Figure 3:
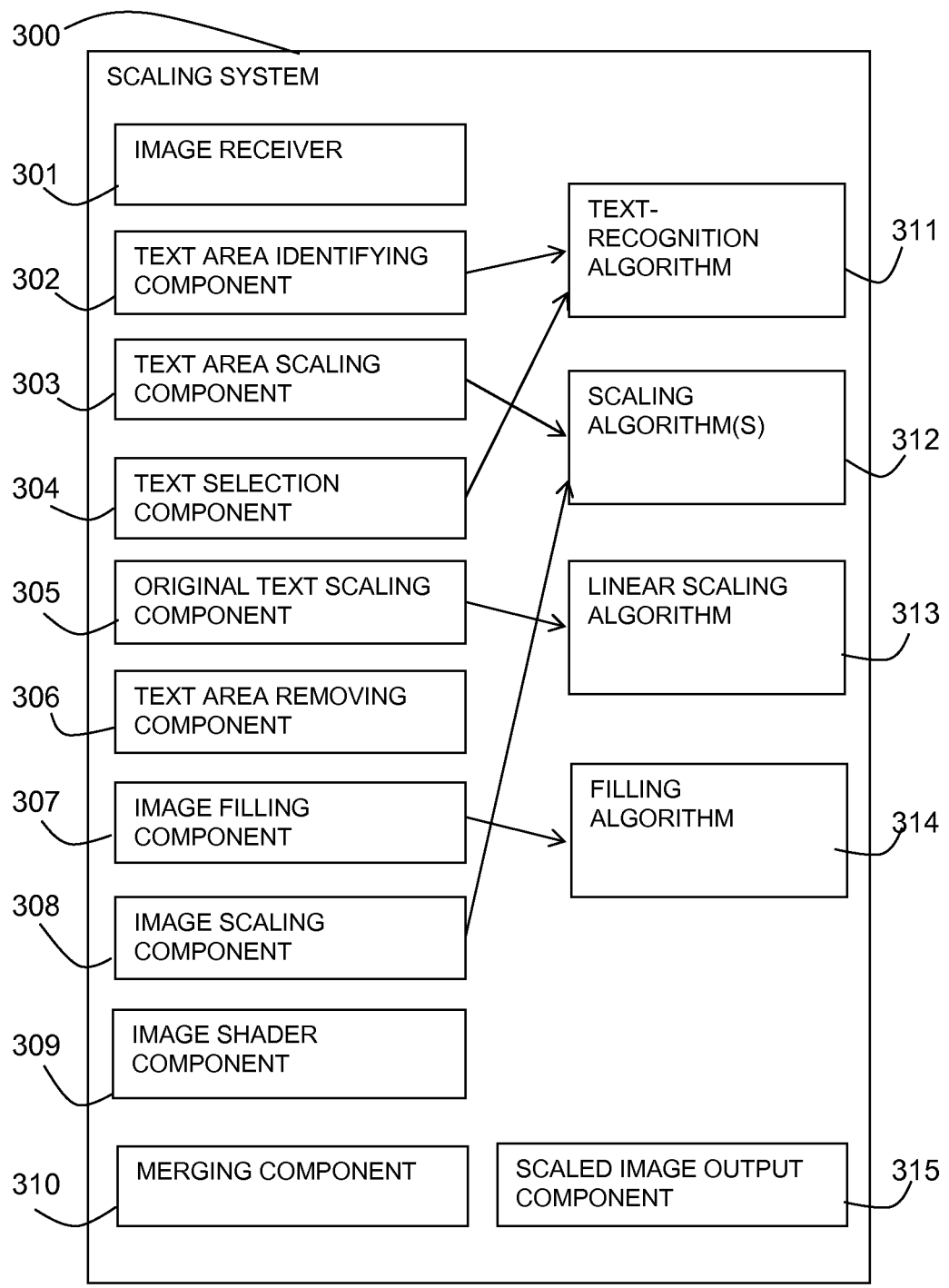
FIG. 3 is block diagram of an example embodiment of a system in accordance with the present invention.

Referring to FIG. 3, a block diagram shows an example embodiment of the described scaling system 300. The scaling system 300 may include an image receiver 301 for receiving an image to be scaled.

The scaling system 300 may include a text area identifying component 302 which may use a text-recognition algorithm 311 to identify areas of text in the received image. A text area scaling component 303 may be provided for scaling the identified text areas using one or more scaling algorithm (s) 312.

An original text scaling component 305 may be provided for linear-scaling a text area with the original text using a linear scaling algorithm 313.

A text selection component 304 may be provided for selecting the clearest version of each text area. The text selection component 304 may compare the clarity of text using a text-recognition algorithm 311 in scaled versions of the text areas including the linear-scaled original text.

A text area removing component 306 may be provided for removing the text areas and an image filling component 307 may be provided for filling in the removed areas with matching background, for example, using a filling algorithm 314.

An image scaling component 308 may be provided for scaling the received image with the removed text areas using a scaling algorithm 312 which may be one of the scaling algorithms used by the text area scaling component 303 or another form of scaling algorithm more suited to the image content. A shader component 309 may also be provided for applying shaders to the scaled image whilst avoiding applying the shaders to the text areas.

A merging component 310 may be provided for merging the scaled image and the selected scaled text areas to provide a final scaled image which may be output by a scaled image output component 315.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements may include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. Software 407 stored in RAM 405 includes system software 408, which includes operating system software 409. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 may be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described herein and according to a first aspect of the present invention there is provided a method for image scaling including low resolution text areas, comprising: determining one or more areas of text in an image to be scaled; scaling the one or more areas of text using two or more scaling algorithms to a required resolution to acquire two or more scaled versions of the text area; selecting the clearest text in a text area from two or more scaled versions of the text area; scaling the overall image to the required resolution; merging the scaled overall image with the selected scaled version of each text area.

One of the scaling algorithms may be a linear algorithm for scaling the original text.

The method may include selecting the clearest text by comparing the two or more scaled versions of the text area using a text-recognition algorithm to provide a metric of the clarity of the text in the text area.

Determining one or more text areas in an image to be scaled may include: applying text-recognition to identify a text area; and drawing a bounding box around a text area. Determining one or more text areas in an image to be scaled may include: applying rules of known characteristics of text areas of an image to identify a text area.

Two or more different scaling algorithms may be used for the group of: each text area and the overall image thereby allowing each text area and the overall image to use the best possible scaling algorithm for the content of the given area.

In one embodiment, the method may include: removing the one or more identified text area from the image; and filling in the removed identified text areas with image matching the surrounding image. The method may include marking the removed identified text areas a distinguishing color before filling with matching overall image. The steps of removing and filling may be carried out on the pre-scaled overall image.

Merging the scaled overall image with the selected one or more text areas may include: replacing pixels in the overall image with any non-alpha pixels in the text areas.

In another embodiment, scaling the overall image to the required resolution may include scaling the original text areas with the overall image and wherein merging the scaled overall image with the selected version of each text area may include overwriting the scaled text areas with the selected scaled version of each text area.

The method may include applying shaders to the scaled overall image prior to merging the scaled overall image with the selected versions of each text area.

The method may include preserving offsets of text areas in the image in order to merge the scaled text areas with the scaled overall image.

According to a second aspect of the present invention there is provided a system for image scaling including low resolution text areas, comprising: a text area identifying component for determining one or more areas of text in an image to be scaled; a text area scaling component for scaling the one or more areas of text using two or more scaling algorithms to a required resolution to acquire two or more scaled versions of the text area; a text selection component for selecting the clearest text in a text area from two or more scaled versions of the text area; an image scaling component for scaling the overall image to the required resolution; a merging component for merging the scaled overall image with the selected scaled version of each text areas.

One of the scaling algorithms may be a linear algorithm for scaling the original text.

The text selection component may include selecting the clearest text by comparing the two or more scaled versions of the text area using a text-recognition algorithm to provide a metric of the clarity of the text in the text area.

The text area identifying component may be for: applying text-recognition to identify a text area; and drawing a bounding box around a text area. The text area identifying component may also be for applying rules of known characteristics of text areas of an image to identify a text area.

Two or more different scaling algorithms may be used for the group of: each text area and the overall image.

In one embodiment, the system may include: a text area removing component for removing the one or more identified text area from the image; and an image filling component for filling in the removed identified text areas with image matching the surrounding image. The text area removing component may be for marking the removed identified text areas a distinguishing color before filling with matching overall image.

The merging component for merging the scaled overall image with the selected one or more text areas may include: replacing pixels in the overall image with any non-alpha pixels in the text areas.

In another embodiment, the image scaling component for scaling the overall image to the required resolution may include scaling the original text areas with the overall image and wherein merging the scaled overall image with the selected version of each text area includes overwriting the scaled text areas with the selected scaled version of each text area.

The system may include an image shader component for applying shaders to the scaled overall image prior to merging the scaled overall image with the selected versions of each text area.

According to a third aspect of the present invention there is provided a computer program product for image scaling including low resolution text areas, the computer program product comprising: a computer readable storage medium readable by a processing circuit and storing instructions for execution by the processing circuit for performing a method according to the first aspect of the present invention.

According to a fourth aspect of the present invention there is provided a computer program stored on a computer readable medium and loadable into the internal memory of a digital computer, comprising software code portions, when said program is run on a computer, for performing a method according to the first aspect of the present invention.

According to a fifth aspect of the present invention there is provided a method substantially as described with reference to the figures.

According to a sixth aspect of the present invention there is provided a system substantially as described with reference to the figures.

The described aspects of the invention provide the advantage of enabling scaling of an image whilst maintaining readability of text areas in the image.

Improvements and modifications can be made to the foregoing without departing from the scope of the present invention.

What is claimed is:

1. A method for image scaling including low resolution text areas, the method comprising:
   determining, by one or more processors, one or more areas of text in an image to be scaled for display on a screen;
   scaling, by one or more processors, the one or more areas of text using two or more scaling algorithms to a required resolution to acquire two or more scaled versions of the text area;
   selecting a clearest text in a text area from two or more scaled versions of the text area to create an overall image;
   removing, by one or more processors, one or more identified text areas from the overall image displayed on the screen;
   filling in, by one or more processors, the removed one or more identified text areas with an image matching a background area surrounding an area from which the identified text is removed;
   marking, by one or more processors, an area of the removed one or more identified text areas with a distinguishing color before filling with a matching overall image;
   scaling, by one or more processors, the overall image to the required resolution;
   applying, by one or more processors, shaders to a scaled overall image prior to merging the scaled overall image with selected versions of each text area;
   merging, by one or more processors, the scaled overall image with the selected scaled version of each text area to create a merged image; and
   displaying, by one or more processors, the merged image on the screen.

2. The method as claimed in claim 1, wherein one of the scaling algorithms is a linear algorithm for scaling the original text.

3. The method as claimed in claim 1, further comprising:
   selecting the clearest text by comparing, by one or more processors, the two or more scaled versions of the text area using a text-recognition algorithm to provide a metric of the clarity of the text in the text area.

4. The method as claimed in claim 1, wherein determining one or more text areas in an image to be scaled comprises:
   applying, by one or more processors, text-recognition to identify a text area; and
   drawing, by one or more processors, a bounding box around a text area.

5. The method as claimed in claim 1, wherein determining one or more text areas in an image to be scaled includes:
   applying, by one or more processors, rules of known characteristics of text areas of an image to identify a text area.

6. The method as claimed in claim 1, wherein two or more different scaling algorithms are used for the group consisting of: each text area and the overall image.

7. The method as claimed in claim 1, wherein said removing and filling are carried out on the pre-scaled overall image.

8. The method as claimed in claim 1, wherein merging the scaled overall image with the selected one or more text areas includes:
replacing by one or more processors, pixels in the overall with any non-alpha pixels in the text areas.

9. The method as claimed in claim 1, wherein scaling the overall image to the required resolution includes scaling the original text areas with the overall image, and wherein merging the scaled overall image with the selected version of each text area includes overwriting the scaled text areas with the selected scaled version of each text area.

10. The method as claimed in claim 1, further comprising:
applying by one or more processors, shaders to the scaled overall image prior to merging the scaled overall image with the selected versions of each text area.

11. The method as claimed in claim 1, further comprising:
preserving, by one or more processors, offsets of text areas in the image in order to merge the scaled text areas with the scaled overall image.

12. A computer system comprising one or more processors, one or more computer readable memories, one or more computer readable storage mediums, wherein said one or more computer readable storage mediums are not transitory signals per se, and program instructions stored on at least one of the one or more storage mediums for execution by at least one of the one or more processors via at least one of the one or more memories, the stored program instructions comprising:
program instructions to determine one or more areas of text in an image to be scaled for display on a screen;
program instructions to scale the one or more areas of text using two or more scaling algorithms to a required resolution to acquire two or more scaled versions of the text area;
program instructions to select a clearest text in a text area from two or more scaled versions of the text area;
program instructions to remove one or more identified text areas from the overall image displayed on the screen;
program instructions to fill in the removed one or more identified text areas with an image matching a background area surrounding an area from which the identified text is removed;
program instructions to mark an area of the removed one or more identified text areas with a distinguishing color before filling with a matching overall image;
program instructions to scale the overall image to the required resolution;
program instructions to apply shaders to a scaled overall image prior to merging the scaled overall image with selected versions of each text area;
program instructions to merge the scaled overall image with the selected scaled version of each text areas to create a merged image; and
program instructions to display the merged image on a screen.

13. The system as claimed in claim 12, wherein one of the scaling algorithms is a linear algorithm for scaling the original text.

14. The system as claimed in claim 12, further comprising:
program instructions to apply text-recognition to identify a text area; and
program instructions to draw a bounding box around a text area.

15. A computer program product for image scaling including low resolution text areas, the computer program product comprising a non-transitory computer readable storage medium having program code embodied therewith, the program code readable and executable by a processor to perform a method comprising:
determining one or more areas of text in an image to be scaled;
scaling the one or more areas of text using two or more scaling algorithms to a required resolution to acquire two or more scaled versions of the text area;
selecting a clearest text in a text area from two or more scaled versions of the text area;
removing one or more identified text areas from the overall image displayed on the screen;
filling in the removed one or more identified text areas with an image matching a background area surrounding an area from which the identified text is removed,
marking an area of the removed one or more identified text areas with a distinguishing color before filling with a matching overall image;
scaling the overall image to the required resolution;
applying shaders to a scaled overall image prior to merging the scaled overall image with selected versions of each text area;
merging the scaled overall image with the selected scaled version of each text area to create a merged image; and
displaying the merged image on a screen.

16. The computer program product as claimed in claim 15, wherein one of the scaling algorithms is a linear algorithm for scaling the original text.

17. The computer program product as claimed in claim 15, wherein the method further comprises:
selecting the clearest text by comparing the two or more scaled versions of the text area using a text-recognition algorithm to provide a metric of the clarity of the text in the text area.

* * * * *